M. HOWARD.
Guard-Finger.
No. 223,807. Patented Jan. 27, 1880.
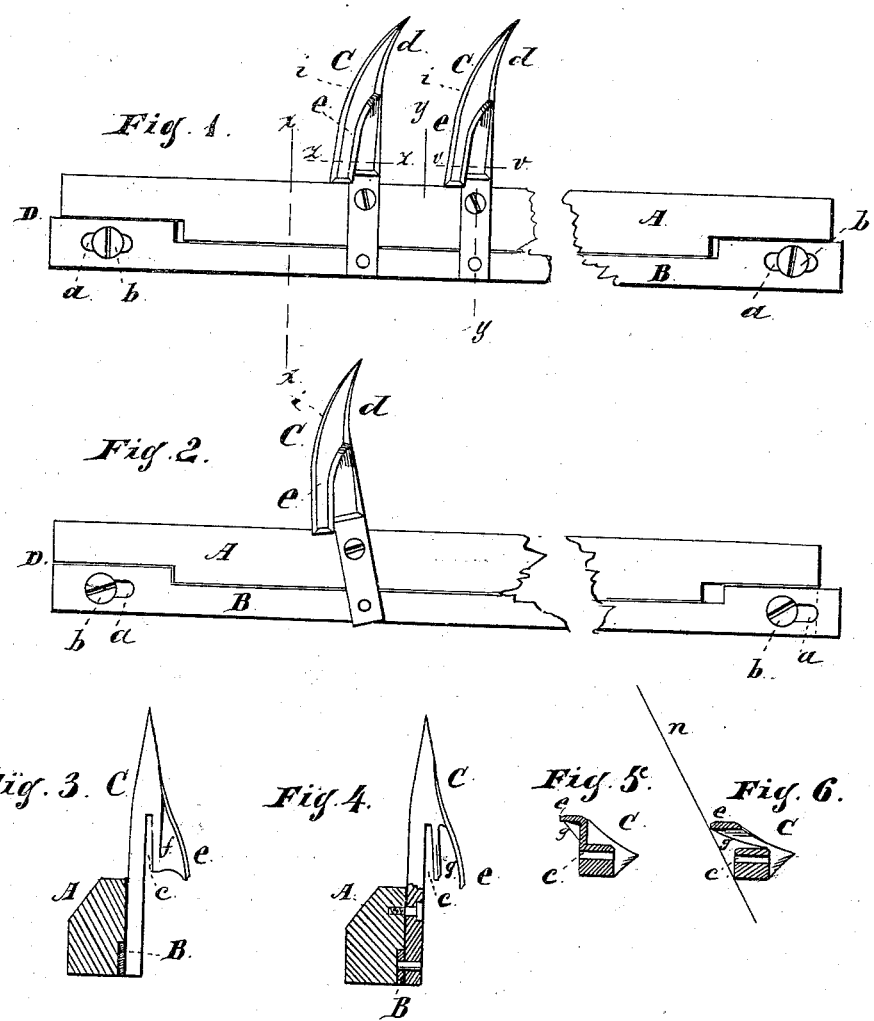

UNITED STATES PATENT OFFICE.

MELVIN HOWARD, OF PLANO, ILLINOIS.

GUARD-FINGER.

SPECIFICATION forming part of Letters Patent No. 223,807, dated January 27, 1880.

Application filed November 25, 1879.

*To all whom it may concern:*

Be it known that I, MELVIN HOWARD, of Plano, Kendall county, State of Illinois, have invented a new and useful Improvement in Sickle-Guards for Harvesters, of which the following is a full description, reference being had to the accompanying drawings, in which—

Figure 1 is a plan. Fig. 2 is a plan, showing the position of the bar B changed. Fig. 3 is a section at $x\ x$ of Fig. 1. Fig. 4 is a section at $y\ y$ of Fig. 1. Fig. 5 is a section at $z\ z$ of Fig. 1. Fig. 6 is a section at $v\ v$ of Fig. 1.

This invention is primarily designed to be used with harvesters which have a traveling apron or carrier, onto which the cut grain falls; but its use is not limited to such machines.

As the sickle-guards of harvesters are now made and used, with traveling platforms or carriers, the cut grain falls upon the platform so that the heads get a little in advance of the butts, and as the grain is carried along by the carrier the tendency is to keep the butts behind, and they are liable to come in contact with and be retarded by the standing grain, and this will be the case even if the grain falls straight across the carrier.

The object of my invention is to so construct and apply the sickle-guards that they will cause the cut grain to fall across the platform at an angle, the heads being thrown a little back and toward the outer end of the cutter-bar. Then, as the grain is carried forward by the carrier, the tendency will be to keep the butts away from the standing grain, and when the grain reaches the elevator it will be nearly straight, the butts still being a little in advance of the heads. This object I accomplish by the form and construction of the guards, and by applying them so that they can be adjusted to increase or decrease the angle, as hereinafter fully set forth.

In the drawings, A represents the finger-beam. B is a metal bar, having a slot, $a$, near each end. It is secured to the finger-beam by means of screws or bolts $b$, which pass through the slots $a$.

C are sickle-guards, having a recess, $c$, for the sickle, as usual. Their outer ends, $d$, are curved.

$e$ is a lip or projection secured to the upper side of the guard near the point. Its outer side or edge, $i$, is curved, and its rear end is carried upward and outward, so that it overhangs the outer edge of the guard proper. This part $e$ may be connected with that part of the guard which is above the sickle by a web, $f$; or there may be a space in place of the web, as shown at $g$.

The guards are connected to the finger-beam and to the bar B by screws or bolts, or in other suitable manner, and so that, if desired, the angle at which they stand can be adjusted by moving the bar B to the right or left. (See Fig. 2.)

In use, the guards, when constructed as described, cause the grain, or a part of it, to stand at an angle when it is cut, as shown by line $n$ in Fig. 6, the grain being thrown over by the overhanging lip $e$, and this will cause the grain to fall across the platform at an angle, the heads being a little nearer to the outer end of the platform than the butts, the outer end of the finger-beam being at D.

In cutting, the tendency of the sickle is to draw the grain in a little toward the guard, thus aiding in causing the grain to fall at an angle.

If desired, the bar B can be moved a little to either the right or left, and thus the position of all the guards will be a little changed, thus increasing or decreasing the angle at which the grain will fall.

There is no change in the cutting devices in common use.

These guards will be found useful on self-rakers to cause the grain to fall upon the platform at an angle either to the right or left, to throw the heads toward the divider, as the construction of the machine requires, in order to leave the grain in a better position for the rake.

As shown in Fig. 1 of the drawings, the guards are at right angles to the finger-beam. They might be set diagonally thereto.

The lip $e$ can be cast with the remaining part of the guard. It is not essential that this lip $e$ be made exactly as shown.

In Fig. 2 the bar B is shown moved to the left, for the purpose of changing the angle of the guards.

What I claim as new, and desire to secure by Letters Patent, is as follows:

1. A sickle-guard having a curved lip or projection, e, upon one side, adapted to cause the cut grain to fall upon the carrier or platform so that the heads will be behind the butts, substantially as specified.

2. The combination of the movable bar B and finger-beam A with sickle-guards C, for the purpose of adjusting the guards at an angle with the finger-beam, substantially as specified.

MELVIN HOWARD.

Witnesses:
C. M. MORRIS,
AUSTIN HOWARD.